(12) United States Patent
Van Gestel et al.

(10) Patent No.: US 6,665,873 B1
(45) Date of Patent: Dec. 16, 2003

(54) TRANSMISSION SYSTEM

(75) Inventors: Henricus A. W. Van Gestel, Eindhoven (NL); Leonardus J. Steenbeek, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/046,033

(22) Filed: Mar. 23, 1998

(30) Foreign Application Priority Data

Apr. 1, 1997 (EP) .............................. 97200944

(51) Int. Cl.$^7$ ............................ H04N 7/16; H04N 7/00; H04N 5/445
(52) U.S. Cl. ........................ 725/136; 348/563; 348/461
(58) Field of Search ......................... 345/327; 348/5.5, 348/12, 13, 10, 6, 7, 2; 455/2, 3.1, 4.2, 5.1, 6.1, 6.2, 6.3; 725/109–113, 136

(56) References Cited

U.S. PATENT DOCUMENTS

| | | | | |
|---|---|---|---|---|
| 4,926,255 A | * | 5/1990 | Von Kohorn | 455/5 |
| 5,444,491 A | * | 8/1995 | Lim | 348/441 |
| 5,465,384 A | * | 11/1995 | Bejan et al. | 455/2 |
| 5,526,035 A | * | 6/1996 | Lappington et al. | 348/13 |
| 5,530,469 A | * | 6/1996 | Garfinkle | 348/13 |
| 5,539,822 A | * | 7/1996 | Lett | 348/13 |
| 5,630,757 A | * | 5/1997 | Gagin et al. | 348/13 |
| 5,701,161 A | * | 12/1997 | Williams et al. | 348/468 |
| 5,929,849 A | * | 7/1999 | Kikinis | 725/113 |
| 5,987,509 A | * | 11/1999 | Portuesi | 709/217 |

FOREIGN PATENT DOCUMENTS

| | | | | |
|---|---|---|---|---|
| WO | | 9619077 | * 6/1996 | H04N/7/025 |

* cited by examiner

*Primary Examiner*—Vivek Srivastava
(74) *Attorney, Agent, or Firm*—Edward W. Goodman

(57) ABSTRACT

Television transmitters often transmit auxiliary operational signals to provide additional services in addition to the conventional television program. An example hereof is interactive television which allows the public to participate in a program, inter alia, by answering questions in a quiz show or voting for the best performance in a song contest. The operational signals identify actions to be taken by the receiver, such as sending the user's response to the transmitter through a modem. To inform the public that a particular service is being offered, the transmitter (1) transmits a logo (150) to indicate the transmission of the operational signals. The receiver (3) is equipped to receive the transmitted logo, compare (352) it with a locally stored logo (350) and process (36) the operational signals only if the transmitted and locally stored logos are perceptibly identical. The logo may be separately encoded or embedded in the conventional television signal. It is easily recognized by the public and thus precludes confusion in the user's mind to whether or not his receiver has the addressed capabilities.

9 Claims, 4 Drawing Sheets

TRANSMISSION SYSTEM

BACKGROUND OF THE INVENTION

1. Field of the Invention

The invention relates to a transmission system including a transmitter and at least one receiver, the transmitter including means for transmitting operational signals for a predetermined operation mode of said receiver, and the receiver including means for processing said operational signals in said operation mode.

2. Description of the Related Art

Transmission systems as referred to in the opening paragraph are generally known, inter alia, in the form of conventional radio or television transmission systems. In such systems, the operational signals are conventional radio or television signals. Also known are transmission systems in which operational signals are transmitted in addition to conventional signals so as to offer additional services or to enhance the operation of the receiver. For example, television transmitters transmit stereo sound signals, teletext pages, or electronic program guide information in addition to the normal television program. Television transmitters may also offer an opportunity for the public to actively participate in a television program. Radio transmitters transmit network information, traffic announcements, etc., in addition to the normal radio program.

It is not always clear to a user whether his receiver is equipped to process the operational signals. For example, conventional television receivers do not decode the operational signals which are transmitted along with an interactive television program and which define actions to be carried out by the receiver when a user actively participates, inter alia, by responding to questions in a quiz show or voting for the best performance in a song contest. If such an interactive program is announced to be broadcast, the owner of a modern but conventional receiver is confused about whether or not he can participate. Often, this results in nuisance calls to the service operator, receiver manufacturer or retailer. The confusion will further deteriorate in the near future when further new services will be introduced.

A typical aspect of this type of service is that the relevant operation mode is to be activated by the user. Needless to say that the user will be very frustrated if the service is announced to be available but his attempts to activate the relevant operation mode fail because the operational signals cannot be processed by his receiver.

SUMMARY OF THE INVENTION

It is an object of the invention to provide a transmission system by which the above-mentioned problems are alleviated.

To that end, the system is characterized in that the transmitter comprises means for transmitting a logo to indicate the transmission of the operational signals. The receiver comprises means for receiving the logo, comparing the received logo with a locally stored logo, enabling the predetermined operation mode only if the received and locally stored logos are perceptibly identical, and reproducing the logo if said operation mode is enabled.

A logo is herein understood to mean a picture and/or audio tune perceptible by a human. It is preferably designed such that it will be recognized by the public as being associated with a particular type of service.

The invention will be appreciated if it is considered that distinctive logos or audio tunes are easily recognized by the public. It is already common practice to print such logos on apparatuses to identify that they have certain capabilities. The invention extends this idea to the signal domain. By transmitting a logo, it becomes immediately clear to the public that the associated service is being broadcast. By means of the invention, it is achieved that receivers become operating only upon reception of the logo or tune for which they have been designed. New services require transmission of a different logo. Incompatible receivers will not respond to such services. The user will immediately understand that because the logo of "his" receiver is not being displayed (either the received, i.e., a different, logo will be displayed or no logo will be displayed at all). Accordingly, the public will not be bothered or confused.

An additional advantage of the invention is the ability to easily trace broadcasters that offer services which are subject to payment of royalty fees, viz., by simply inspecting the logo. This advantage is further enhanced if the logo meets the requirements of being protectable by copyright and/or trademark law.

In an embodiment of the invention, the logo indicates the transmission format of the operational signals. The term transmission format is not restricted to the physical structure (such as modulation type or length of data bits) of the operational signals but also includes the application structure (such as the syntax of data items). It is envisaged that different standards for new services, such as interactive television, will coexist in the future. The logo not only indicates that an interactive program is broadcast, it also identifies the transmission format. With this embodiment, confusion is avoided as to whether or not a receiver is able to decode a transmitted service.

The logo may be separately encoded and transmitted in addition to conventional video or audio signals, e.g., in the vertical blanking interval of an analog television signal or as service information data packets in a digital television signal. The indicator may also be part of the conventional video or audio signal. In that case, the receiver comprises means for extracting the logo from said conventional video or audio signal.

In order to achieve that receivers indeed decode the transmitted logo and remain inoperative if the 'wrong' logo is received, the operational signals may be transmitted in scrambled form, using the logo as a scrambling key. The receiver is adapted to descramble the operational signals using the transmitted logo.

DESCRIPTION OF THE PREFERRED EMBODIMENTS

Figure 1:
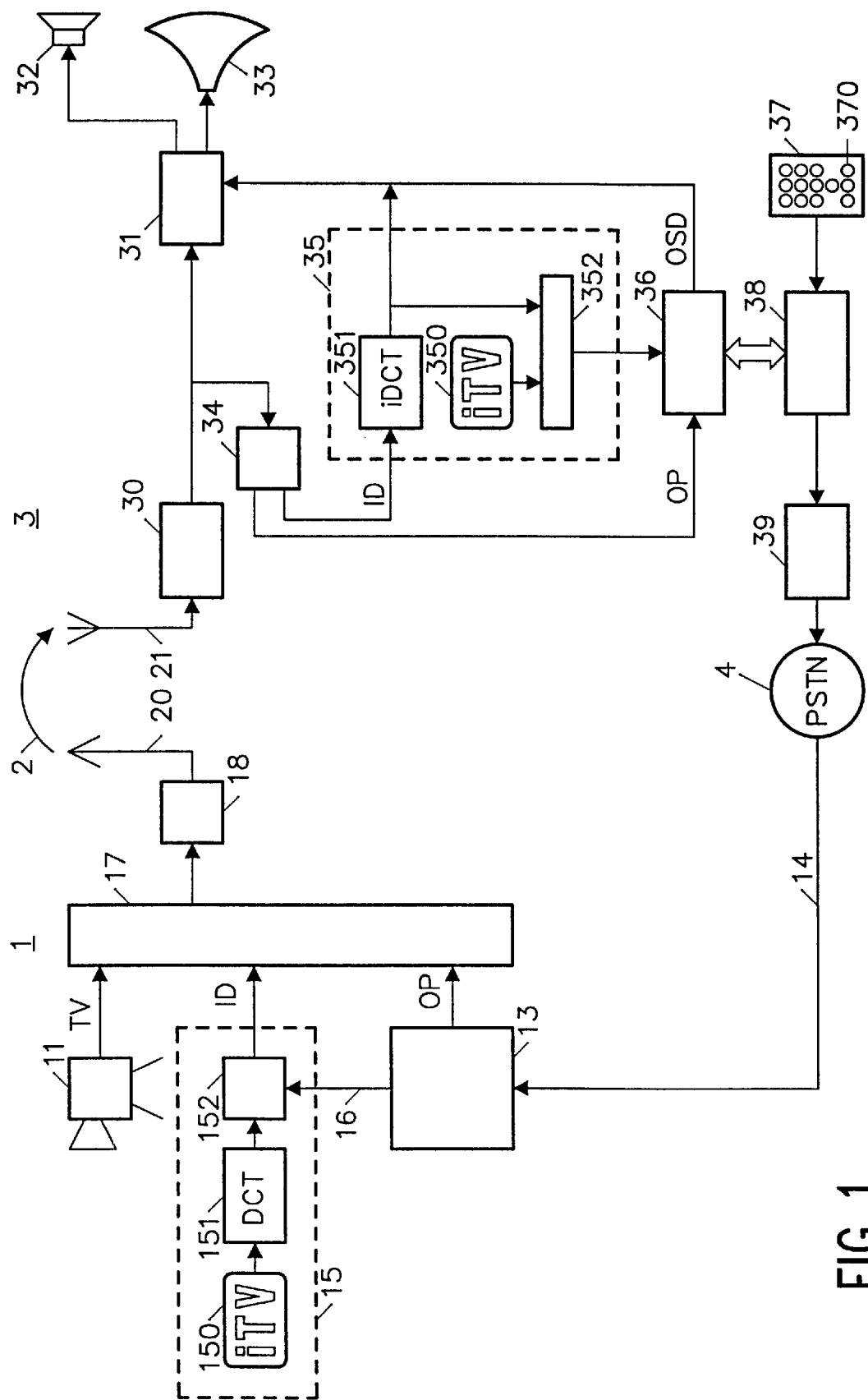
FIG. 1 shows a schematic diagram of a transmission system in accordance with the invention.

The invention will now be described with reference to an interactive television transmission system. FIG. 1 shows a schematic diagram of such an interactive transmission system. The system comprises an interactive television transmitter 1, a broadcast channel 2, an interactive television receiver 3 and a backwards channel 4. The broadcast channel 2 may also be a storage medium,such as a magnetic tape or optical disc,on which a television program is stored. The backwards channel 4 is here assumed to be the public switched telephone network (PSTN).

The transmitter 1 comprises a television program signal source, which is represented here by a television camera 11 generating a conventional television signal TV. The television program is, for example, a quiz show in which the public may participate by sending answers to the questions. To that end, a computer system 13 generates operational signals OP in the form of data sequences defining messages to appear on screen and actions to be taken by the receivers in response to participation by the user. For example, the data sequences define a telephone number to be called by the receivers, identify how the user's response is to be encoded in the telephone call, and specify a time interval during which answers may be given. In the present embodiment, the operational signals OP are transmitted in a teletext-like manner in the vertical blanking interval of the television signal. In order to receive the phone calls from the public, the computer system 13 is coupled to the public switched telephone network 4 through telephone connections 14. In accordance with the invention, the transmitter further comprises a picture logo generator 15 for transmitting an audio-visual picture logo ID. The transmitted logo ID indicates that an interactive television program is being broadcast. To that end, the picture logo generator 15 is controlled by the computer system 13 through a connection 16. The television signal TV, logo ID, and operational signals OP are combined in a combiner stage 17 and collectively applied to a modulator 18 for RF transmission via an antenna 20.

The logo generator 15 comprises a picture logo signal source 150 defining an artistic and aesthetically satisfying picture logo which has been designed to represent an interactive television program in accordance with a given standard. The logo has a dimension, inter alia, of 48 pixels horizontally and 32 pixels vertically occupying a small but perceptible portion of the display screen of a receiver. In order to save transmission capacity for transmitting the logo, the picture is encoded by a Discrete Cosine Transform (DCT) circuit 151 which is well known in the art of video coding and compression. Obviously, other methods of encoding the logo are also possible. The encoded picture is stored in a memory 152 and read out in response to a control signal from computer system 13 through connection 16. It will be appreciated that encoding is to be performed only once in practice and may be done by external circuitry. The encoded picture is then once-only stored in the memory 152.

Figure 2:
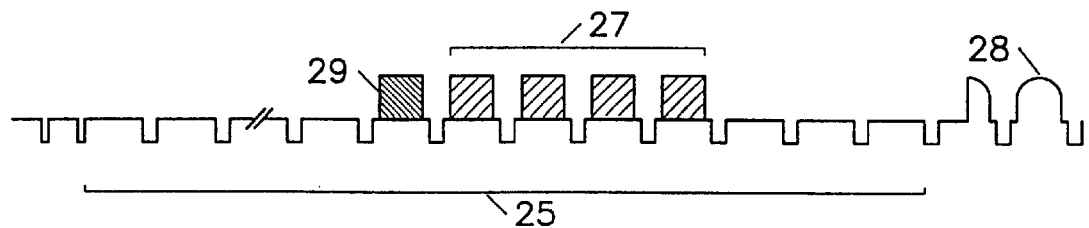
FIG. 2 shows a part of a television signal waveform including an audiovisual logo in accordance with the invention.

FIG. 2 shows a part of the television signal waveform transmitted by the transmitter. Reference numeral 25 denotes the vertical blanking interval of the television signal which comprises, in a 625-line system, lines 6–22 of one field and lines 318–335 of the other field. Numeral 27 denotes the operational signals OP in the form of data packets which are transmitted if the television program is an interactive program. Numeral 29 denotes a data packet in which the encoded picture logo, i.e., the contents of memory 152 (see FIG. 1), is accommodated. The other lines of the vertical blanking interval may be used for the transmission, inter alia, of conventional teletext signals. Numeral 28 denotes one of the lines of the active video interval conveying the conventional analog video signal.

Returning to FIG. 1, the transmitted signal is received by the receiver 3 through an antenna 21 and demodulated by a tuner 30. The tuner applies the demodulated baseband signal to conventional audio and video processing circuitry 31 to reproduce the TV program through a loudspeaker 32 and a display screen 33. The baseband signal is further applied to a data slicer 34 which extracts the data embedded in the vertical blanking interval of the signal. The operational signals OP (27 in FIG. 2) are applied to a processing circuit 36 for processing in an interactive operation mode of the receiver. The processing circuit 36 controlled by a microprocessor 38 which receives user commands from a (remote) control unit 37 and is further coupled, via a modem 39, to the telephone network 4. The interactive operation mode is activated by the user in response to pressing a key 370 of the remote control unit 37. In the interactive operation mode, the processing circuit 36 generates on-screen-display signals OSD for display on the screen 33 and transmit the user's responses back to the transmitter.

The logo data ID (29 in FIG. 2) is applied to a picture logo decoder 35 which comprises a logo memory 350, an inverse Discrete Cosine Transform (iDCT) circuit 351, and a comparator 352. The iDCT circuit performs the inverse operation of DCT circuit 151 in the transmitter. Accordingly, it reconstructs the pixels forming the logo 150 transmitted by the transmitter. The received picture logo is applied to the display screen 33 for display together with the conventional television signal. The user is thus informed that the current television program is an interactive program. In response thereto, the user may wish to activate the interactive operation mode of the receiver by pressing the key 370.

The pixels from the iDCT circuit 351 are also applied to a comparator 352 which compares the received picture logo, on a pixel-by-pixel basis, with a picture logo that is locally stored in a memory 350 of the receiver. The comparator detects whether the received logo 150 and the stored logo 350 are substantially identical. Substantially identical means that both logos are perceptibly similar. For example, the comparator detects whether the mean square error between both pictures is below a certain threshold. The output of the comparator 352 is applied to an enable-input of the processing circuit 36. The processing circuit 36 is enabled only when the received and the stored logo are identical. It will be appreciated that the enable signal may also be applied to the microprocessor 38. In any case, the user can only activate the interactive operation mode if both logos are perceptibly similar. If they are not similar, inter alia, because a service is offered which can not be processed by the receiver, the user will understand that in view of the fact that the displayed logo is different from the logo he is accustomed to.

Figure 3:
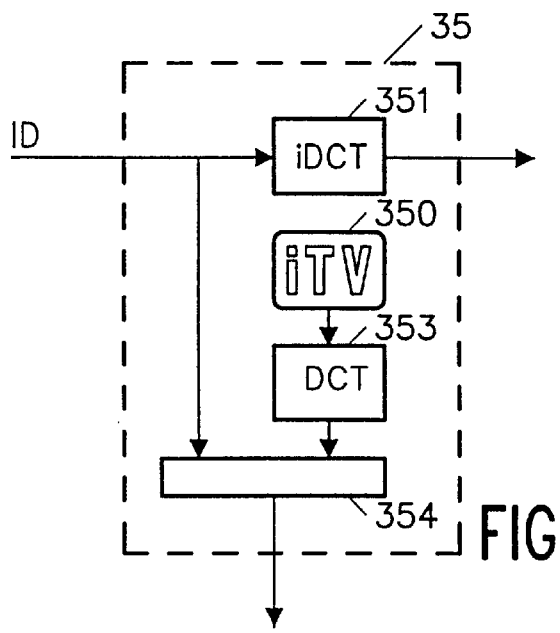
FIGS. 3 and 4 show embodiments of a picture logo decoder which is part of the system shown in FIG. 1.

FIG. 3 shows a further embodiment of the picture logo decoder 35. In this embodiment, the received and stored logos are compared in the frequency domain rather than the pixel domain. To that end, the stored logo 350 is encoded by a DCT circuit 353 which is the same as DCT circuit 151 at the transmitter end. The comparator 354 is now adapted to compare those transform coefficients that are considered to be characteristic of the logo. This is a less complicated task than comparing the logos on a pixel-by-pixel basis. For example, only the DC coefficients and some characteristic AC coefficients need to be compared. As already noted with respect to the transmitter, the logo can also be encoded externally, e.g., at the manufacturing stage, and then once-only stored in the receiver.

Figure 4:
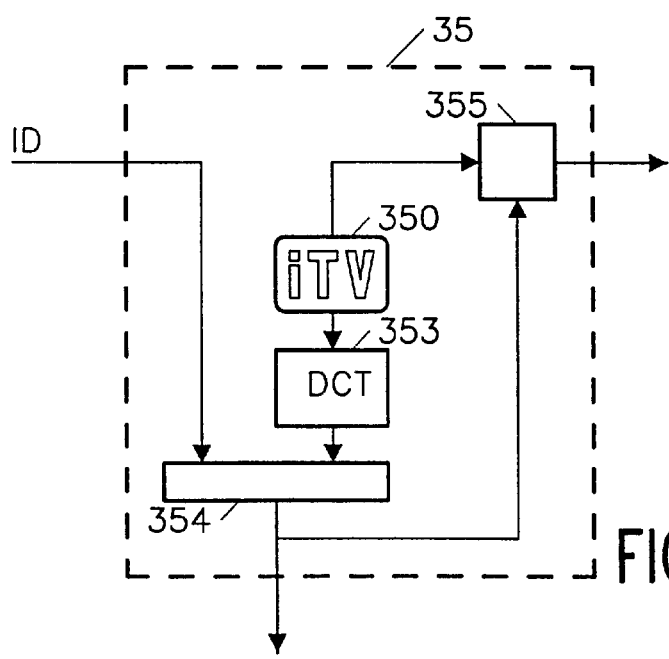

In both embodiments of the picture logo decoder 35, the received logo is displayed irrespective of whether it matches the stored logo or not. Either one of the logos can be displaced, provided that they have been found to be similar. In a further embodiment, the user will only be alerted to the fact that the television program is interactive if his receiver is indeed compatible with the interactive transmission format. FIG. 4 shows a modified version of the decoder 35 with which this is achieved. The picture logo decoder 35 now includes a display generator 355 for displaying the stored logo 350 in response to the enabling output of comparator 354.

Figure 5:
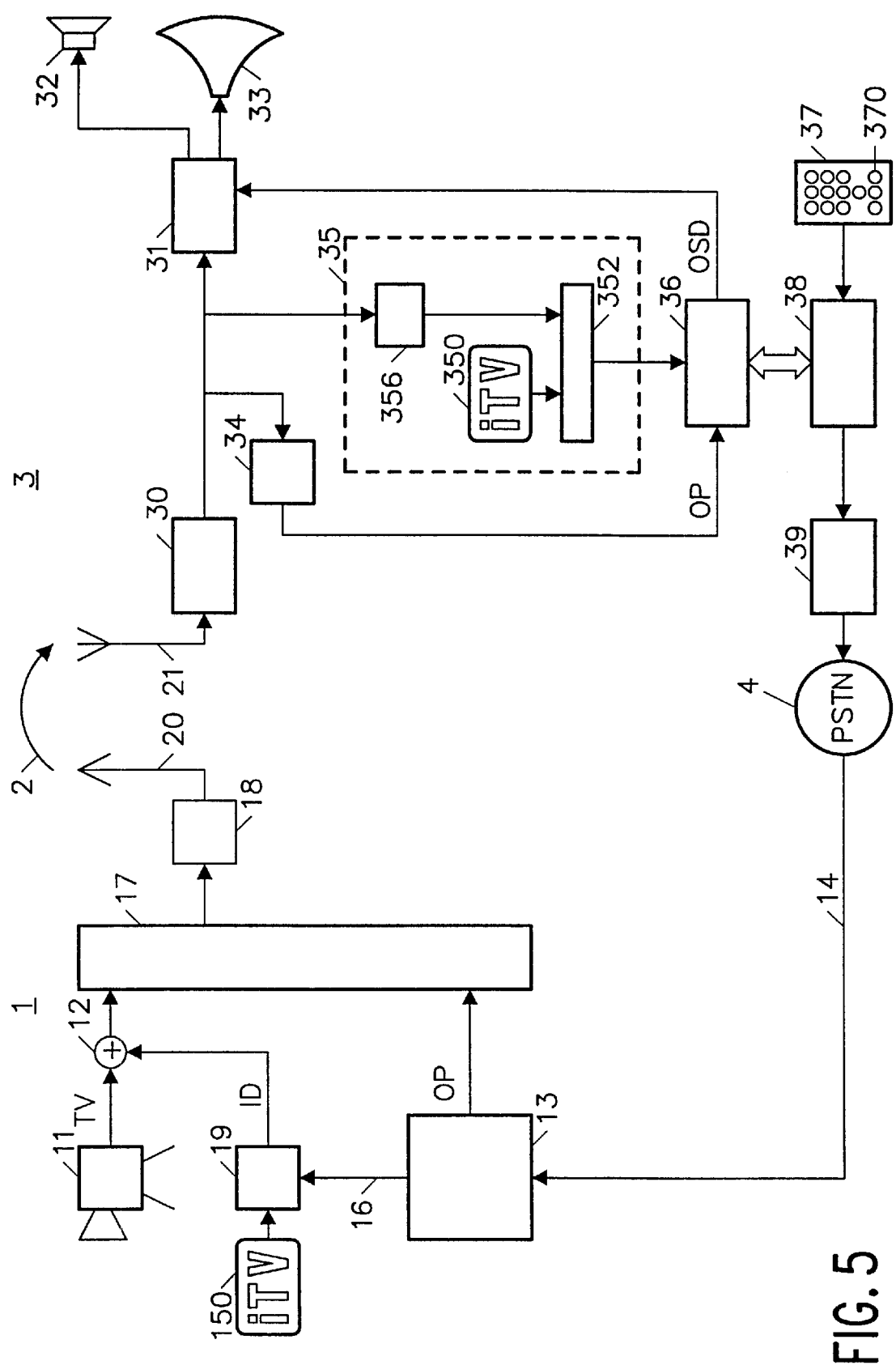
FIGS. 5 and 6 show further embodiments of the transmission system in accordance with the invention.

FIG. 5 shows a further embodiment of an interactive transmission system in accordance with the invention. In this embodiment, the logo is embedded in the active video interval of the conventional television signal, i.e., in a visible manner. To that end, the picture logo signal source 150, which, in practice, is a non-volatile memory in which the pixels are stored, is inserted in the conventional video signal TV through a switch 19 and an inserter 12. The switch 19 is controlled by the computer 13 through the line 16 during the broadcast of an interactive program.

In this embodiment, the picture logo decoder 35 of the receiver 3 comprises means 356 for extracting the logo from the baseband video signal. Said means, basically including a timing window generator and a memory, can easily be designed by a person skilled in the art. The rest of the decoder (memory 350 locally storing the reference logo, and comparator 352 for comparing the received and stored logos) corresponds to the same elements shown in FIG. 1. Its operation has already been described above. The embodiment shown in FIG. 5 is particularly advantageous in digital television (e.g. MPEG2) systems in which the television signal including the transmitted logo is DCT encoded. In such a system, the comparison of transmitted and locally stored logos can easily be done in the frequency domain, viz., by comparing selected transform coefficients.

Figure 6:
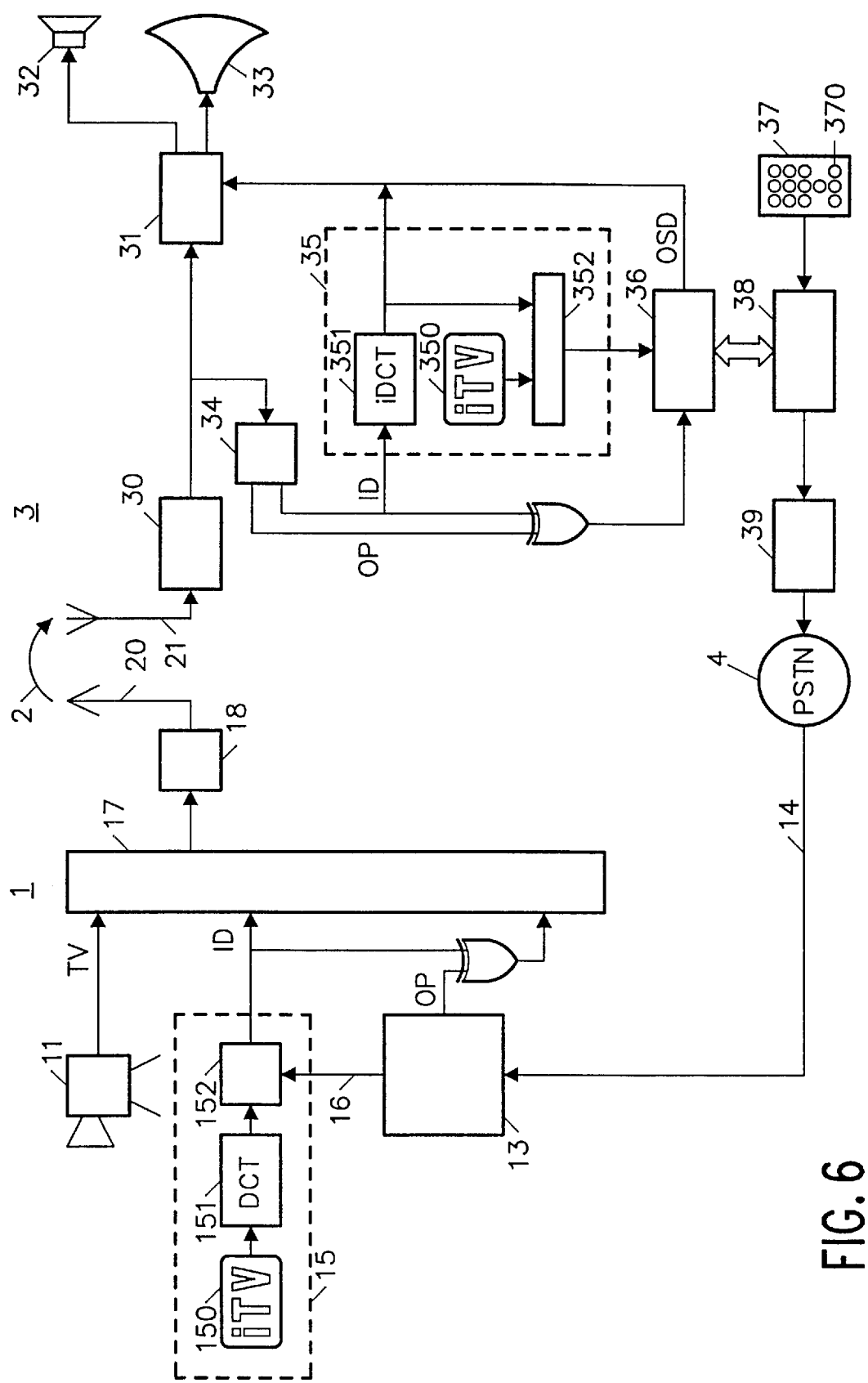

FIG. 6 shows a further embodiment of the transmission system. This embodiment differs from the one shown in FIG. 1 in that the transmitter comprises an exclusive-OR circuit 41 for scrambling the operational signals, using the logo bit pattern as the scrambling key. The receiver comprises a corresponding exclusive-OR gate 42 for descrambling the received operational signals, using the received logo bit pattern. By means of this embodiment, it is achieved that a receiver cannot operate without extracting the transmitted logo, i.e., paying royalty fees for decoding and offering a service for which such fees are due.

In the above-described examples, the picture logo ID is assumed to be continuously transmitted when an interactive television program is being broadcast. It will be appreciated that the picture logo may also be transmitted at regular time intervals, e.g., once per second. It may also take the form of a start signal and thus be transmitted only at the beginning of an interactive television program.

Further, the means for comparing the received and the stored logo have been shown as dedicated hardware circuitry. It will be appreciated that this comparison may also be carried out by the microprocessor 38 under the control of a stored program.

The invention also allows different logos to be transmitted for different types of operations or different receiver capabilities. One logo may define an interactive television program. Another logo may identify the transmission of a commercial accompanied by a home shopping service allowing the user to order a product and enter data, such as desired color, size, etc. Different logos may further be used for activating different types of hardware. For example, transactions which involve debiting an amount of money from a smart card require the receiver to have a card reader in addition to the modem. The transmission of a specific logo for such a transaction enables the card reader to be activated. Receivers not having the card reader will not respond.

The invention can be summarized as follows. Television transmitters often transmit auxiliary operational signals to provide additional services in addition to the conventional television program. An example hereof is interactive television which allows the public to participate in a program, inter alia, by answering questions in a quiz show or voting for the best performance in a song contest. The operational signals identify actions to be taken by the receiver, such as sending the user's response to the transmitter through a modem. To inform the public that a particular service is being offered, the transmitter (1) transmits a logo (150) to indicate the transmission of the operational signals. The receiver (3) is equipped to receive the transmitted logo, compare (352) it with a locally stored logo (350) and process (36) the operational signals only if the transmitted and locally stored logos are perceptibly identical. The logo may be separately encoded or embedded in the conventional television signal. It is easily recognized by the public and thus precludes confusion in the user's mind as to whether or not his receiver has the addressed capabilities.

What is claimed is:

1. A transmission system including a transmitter and at least one receiver, the transmitter comprising means for transmitting operational signals for a predetermined operation mode of said receiver, and the receiver comprising means for processing said operational signals in said operation mode, characterized in that the transmitter further comprises means for transmitting a logo to indicate the transmission of said operational signals, and that the receiver further comprises:

means for receiving the logo;

means for comparing the received logo with a locally stored logo;

means for enabling the predetermined operation mode only if the received and locally stored logos are perceptibly identical; and means for reproducing the logo if said operation mode is enabled such that said logo is perceptible by a user of said receiver.

2. A method of transmitting operational signals to a receiver for a predetermined operation mode of said receiver, said method comprising the steps:

generating operational signals for said receiver; and transmitting said operational signals to said receiver, characterized in that said method further comprises the steps:

generating a logo signal representing a logo perceptible by a person; and transmitting said logo signal along with said operational signals such that said receiver reproduces the logo, the perception of the logo by a user of the receiver indicating to the user the transmission of said operational signals, characterized in that the method further comprises the steps:

encoding the logo signal; and prior to said transmitting step, scrambling the operational signals using the encoded logo signal as a scrambling key.

3. A method of receiving operational signals from a transmitter and processing said operational signals in a predetermined operation mode in which a logo signal representing a logo indicating the transmission of said operational signals is transmitted with said operational signals, characterized in that said method comprises the steps:

receiving from said transmitter the operational signals and the logo signal indicating the transmission of said operational signals;

comparing the logo in the received logo signal with a locally stored logo;

enabling the predetermined operation mode only if the logo in the received logo signal and locally stored logos are perceptibly identical; and reproducing the logo at least in said operation mode such that said logo is perceptible by a user of the receiver.

4. The method as claimed in claim 3, characterized in that the logo indicates a transmission format of the operational signals.

5. The method as claimed in claim 3, in which the operational signals and the logo signal are transmitted in addition to conventional video or audio signals, and the logo signal is encoded separately from said conventional video or audio signals, characterized in that the method further comprises the step:

decoding the encoded logo signal.

6. A method as claimed in claim 3, in which the operational signals and the logo signal are transmitted in addition to conventional video or audio signals, and the logo signal is combined with said conventional video or audio signals prior to transmission, characterized in that the method further comprises the step:

extracting the logo signal from said conventional video or audio signals.

7. The method as claimed in claim 3, characterized in that the logo indicates the transmission of an interactive television program.

8. The method as claimed in claim 3, in which, prior to transmission, the operational signals are scrambled using the logo signal as a scrambling key, characterized in that the method further comprises the step:

descrambling the operational signals using the received logo signal.

9. A receiver for receiving operational signals and a logo signal from a transmitter, and processing said operational signals in said operation mode, characterized in that the receiver comprises:

means for receiving from said transmitter said operational signals and said logo signal representing a logo indicating the transmission of said operational signals;

means for comparing the logo represented by the received logo signal with a locally stored logo;

means for enabling the predetermined operation mode only if the logo represented by the received logo signal and the locally stored logo are perceptibly identical; and means for reproducing the logo at least in said operation mode such that the logo is perceptible by a user of the receiver.

* * * * *